Aug. 11, 1970   T. G. CROW   3,523,718
LOW TEMPERATURE OPTICAL ISOLATOR FOR LASER SYSTEMS
Filed April 17, 1968

Thomas G. Crow,
INVENTOR.

BY Harry M. Saragovitz
Edward J. Kelly
Herbert Berl
Harold W. Hilton

United States Patent Office 3,523,718
Patented Aug. 11, 1970

3,523,718
LOW TEMPERATURE OPTICAL ISOLATOR
FOR LASER SYSTEMS
Thomas G. Crow, Orlando, Fla., assignor to the United
States of America, as represented by the Secretary of
the Army
Filed Apr. 17, 1968, Ser. No. 722,044
Int. Cl. G02f 1/22
U.S. Cl. 350—151                                5 Claims

ABSTRACT OF THE DISCLOSURE

An optical isolator for use in laser systems and particularly in a neodymium glass laser system having a plurality of amplifier elements arranged successively therein. The device is comprised of a paramagnetic Faraday rotator immersed in cryogenic fluid such as liquid helium and surrounded by a superconducting magnet. The device is placed between successive amplifier elements of the laser system to permit forward direction of the laser beam through the system while preventing backward movement of amplified spontaneous emission. The isolator provides for linear polarization of the laser beam, followed by a Faraday rotation through 45°, followed by a polarizer (set at 45°) and then an optically active plate to return the plane of polarization to 0°.

DEDICATORY CLAUSE

The invention described herein may be manufactured, used, and licensed by or for the Government for governmental purposes without the payment to me of any royalty.

BACKGROUND OF THE INVENTION

In the Faraday effect, the amount of rotation of the light is (usually) proportional to the path length of the light in the particular substance used and to the component of the magnetic field (H) in that direction. The Faraday rotation has three major parameters involved in its evaluation, the optical absorption and the homogeneity of the materials, and the Verdet constant (V). The Verdet constant is given by relationship:

$$V = -\theta-/Hl$$

V = Verdet constant
$-\theta-$ = rotation of the plane of polarization in minutes
H = applied magnetic field in orsteds
$l$ = optical path length.

The advantages of the present invention are derived from the temperature dependence of the Verdet constant in paramagnetic materials. In cerium, for example, the paramagnetic Verdet constant varies in an inverse ratio to temperature, at a wavelength of 5461 angstroms. Thus, by applying cryogenic temperatures to the materials, the paramagnetic constant would increase rapidly.

In a neodymium glass laser system a plurality of amplifier elements are disposed for successively amplifying light generated in the system by spontaneous emission. The optical isolator of the present invention provides the necessary polarization and Faraday rotation to permit the beam to go easily forward in the system and to prevent amplified spontaneous emission from proceeding backward toward the low level components.

SUMMARY OF THE INVENTION

The present device utilizes a paramagnetic Faraday rotator immersed in liquid helium and surrounded by a superconducting magnet. The isolator is placed between successive amplifier elements of the laser system and prevents a laser beam from passing backward through the system to the low level components of the system.

It is, therefore, an object of the present invention to provide means for optically isolating successive amplifier elements of a laser system.

It is another object of the present invention to provide such optical means which permits forward progress of the laser beam and yet prevents backward progress of the amplified spontaneous emission to the low level components of the system.

It is yet a further object of the present invention to provide such means in which a paramagnetic Faraday rotator is subjected to cryogenic temperatures and a high magnetic field for rotation of the plane of polarization of the beam to permit the forward progress thereof while preventing the rearward progress of the amplified spontaneous emission.

The foregoing and other objects of the present invention will become more readily apparent from the following detailed description and accompanying drawing.

DESCRIPTION OF THE PREFERRED EMBODIMENT

Figure 1:
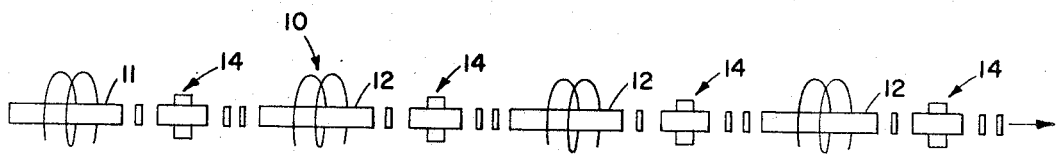
FIG. 1 is a diagrammatic view of a laser system incorporating the device of the present invention.

As shown in FIG. 1, a neodymium glass laser system 10 is diagrammatically shown to include a laser generator 11 and a plurality of amplifier elements 12 arranged in successive order. Spontaneous emission is made to occur in the generator by means well known in the art, and a laser beam is emitted therefrom to an amplifier element 12 where it is amplified and then to a third amplifier element for further amplification, and so on. To permit the beam to progress forward and to prevent amplified spontaneous emission from progressing rearwardly to the low level components, an optical isolator 14 is placed between the amplifier elements.

Figure 2:
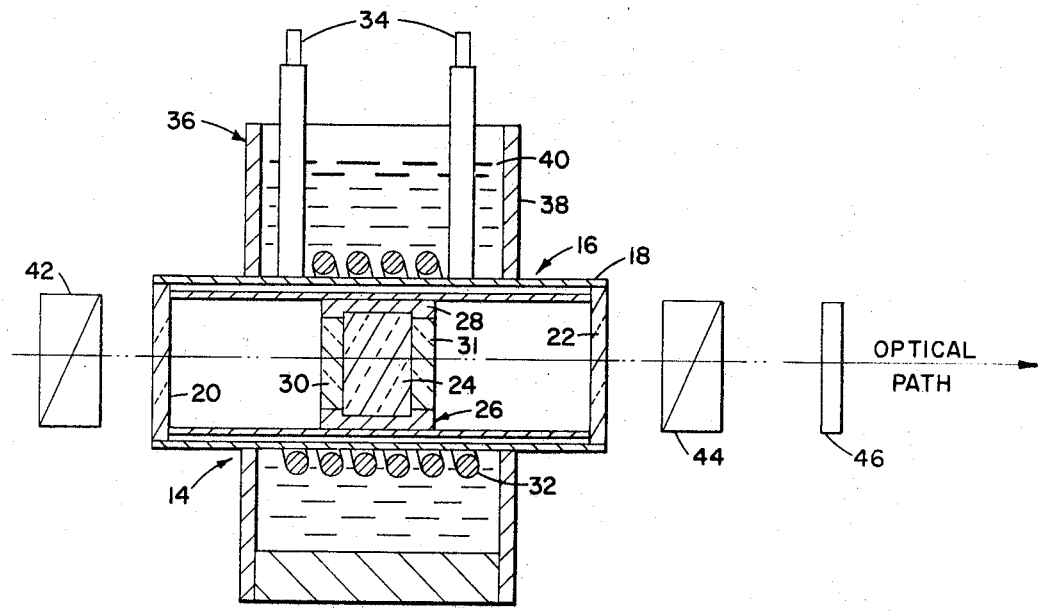
FIG. 2 is an elevational sectional view of the device of the present invention.

As more clearly shown in FIG. 2, the optical isolator includes a substantially cylindrical housing 16 having insulated Dewar walls 18 and end enclosures 20 and 22 which are of sapphire, quartz, or glass. The interior of housing 16 is evacuated.

A paramagnetic member 24, such as cerium, is mounted in a housing 26 secured in cylindrical housing 16. Housing 26 includes an outer substantially cylindrical electrical conductive member 28, such as copper, and a pair of end windows 30 and 31 of a material such as sapphire.

A coil 32 is circumferentially mounted about housing 16 and in surrounding relation with the paramagnetic member and copper housing. Coil 32 is a superconductive magnet connected to a source of electrical energy through conductors 34. Enclosing the coil is a housing 36 having Dewar walls 38 and a cryogenic fluid such as liquid helium 40 carried therein.

A pair of polarizers 42 and 44 is mounted in the path of the beam adjacent the end enclosures 20 and 22 of housing 16 at 45° angle with respect to each other.

In operation, the laser generator is excited by a pumping source by means well known in the art, to provide stimulated emission of radiation. A laser beam is emitted from the laser and progresses to the first of the successive amplifier elements for amplification thereof, it passes through polarizer 42 for polarization of the beam. Coil 32 of the optical isolator is then energized to set up a strong magnetic field about the paramagnetic member to effect the Faraday rotation. The cryogenic fluid and the application of a strong magnetic field increases the Verdet constant of the paramagnetic material to provide rotation of the plane of vibration of the polarized beam being transmitted through the paramagnetic member to permit the beam to progress forward while preventing backward progress of the amplified spontaneous emission to the low level components. The beam then passes through polarizer 44, set at a 45° angle with respect to polarizer 42 and then to an optically active plate 46 to return the plane of polarization to 0°. The beam is then directed to the next successive amplifier element. As stated above, an optical isolator is placed between each successive amplifier element for isolation of each amplifier element in the system.

Some paramagnetic materials which may be utilized in the present invention are cerium, oxides of praseodymium, terbium, neodymium in a glass host.

It is to be understood that the embodiment described herein is merely illustrative of the inventive concepts involved in the present invention. Various other modifications may be made by those skilled in the art without departing from the spirit and scope of this invention.

I claim:

1. In a laser system having means for generating a laser beam and a plurality of amplifier elements for passage of said laser beam therethrough, means for optically isolating successive amplifier elements comprising:
   (a) a housing having a paramagnetic member carried therein in the path of said beam, said housing including a first member having Dewar walls enclosing said paramagnetic member, the interior of said first member being evacuated, and a second member having Dewar walls disposed in surrounding relation about said first member;
   (b) cryogenic fluid means carried in said second member in surrounding relation with said first member;
   (c) coil means connected to a source of electrical energy and disposed in said cryogenic fluid to provide a superconducting magnet disposed in surrounding relation with said first member substantially adjacent said paramagnetic member;
   (d) mounting means for securing said paramagnetic member in said housing including a substantially cylindrical member of electrically conductive material enclosing said paramagnetic member and having the ends thereof open, and a pair of sapphire windows, each mounted in said open ends of said cylindrical member;
   (e) polarizing means disposed for polarization of said beam prior to and subsequent to passage of said beam through said paramagnetic member.

2. A device as in claim 1 wherein said cryogenic fluid is liquid helium.

3. A device as in claim 2 wherein said first member of said housing is provided with sapphire windows at each end thereof for passage of the beam therethrough.

4. A device as in claim 3 wherein said polarizing means includes a pair of polarizers, each disposed adjacent one of said sapphire windows of said first member of said housing at 45° angle with respect to each other and an optically active plate for returning the plane of polarization to zero.

5. A device as in claim 4 wherein said paramagnetic member is cerium.

References Cited

UNITED STATES PATENTS

| 3,245,314 | 4/1966 | Dillon | 350—151 |
| 3,420,601 | 1/1969 | Young et al. | 350—151 |

OTHER REFERENCES

Berger et al.: "A Comparison of the Optical Faraday Rotation and Magnetic Susceptibility of Cerous Phosphate Glass," Journal of Applied Physics, vol. 35, No. 6 (June 1964), pp. 1798–1801.

DAVID SCHONBERG, Primary Examiner

P. R. MILLER, Assistant Examiner

U.S. Cl. X.R.

350—167, 175